United States Patent
Katoh et al.

(10) Patent No.: US 6,845,796 B2
(45) Date of Patent: Jan. 25, 2005

(54) CUSHION TIRE

(75) Inventors: Yusaku Katoh, Fukuyama (JP); Satoru Oda, Fukuyama (JP); Hirotaka Ozaki, Fukuyama (JP); Nobuo Fujita, Tokyo (JP); Fumio Ikesugi, Tokyo (JP); Kazuo Kawashima, Oyama (JP); Teruki Aoyagi, Oyama (JP)

(73) Assignees: Fukuyama Rubber Ind. Co., Ltd., Fukuyama (JP); Komatsu Forklift Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/033,362

(22) Filed: Dec. 27, 2001

(65) Prior Publication Data

US 2002/0092589 A1 Jul. 18, 2002

(30) Foreign Application Priority Data

Dec. 28, 2000 (JP) ........................................ 2000-400892

(51) Int. Cl.$^7$ ............................ B60C 7/10; B60C 11/03
(52) U.S. Cl. .............................. 152/209.1; 152/209.12; 152/209.15; 152/302; 152/324; 152/393; 152/523
(58) Field of Search .................. 152/209.1, 209.12, 152/5, 7, 301–303, 323–329, 523, 393, 544, 209.15

(56) References Cited

U.S. PATENT DOCUMENTS

| | | | | |
|---|---|---|---|---|
| 597,313 A | * | 1/1898 | Carmont | ..................... 152/324 |
| 649,775 A | * | 5/1900 | Sweet | |
| 1,237,227 A | * | 8/1917 | Swartz | |
| 1,328,632 A | * | 1/1920 | Kremer | |
| 1,485,573 A | * | 3/1924 | Swinehart | |
| 1,560,551 A | * | 11/1925 | Eger | |
| D153,431 S | * | 4/1949 | Hawkinson | ................ D12/599 |
| 3,957,101 A | * | 5/1976 | Ippen et al. | |
| 4,226,273 A | * | 10/1980 | Long et al. | |
| 5,139,066 A | * | 8/1992 | Jarman | |
| 5,538,059 A | | 7/1996 | Brayer | |
| 5,579,818 A | * | 12/1996 | Hoppenheit et al. | |
| 6,298,890 B1 | * | 10/2001 | Binsfeld | |

FOREIGN PATENT DOCUMENTS

| | | | |
|---|---|---|---|
| EP | 28350 | * | 5/1981 |
| IT | 250007 | * | 9/1926 |
| JP | 2000-25410 | * | 1/2000 |
| WO | WO 96/05917 | * | 2/1996 |
| WO | WO 96/22891 | * | 8/1996 |
| WO | WO 97/18959 | * | 5/1997 |

OTHER PUBLICATIONS

Machine tranlsation for Japan 2000–25410.*

* cited by examiner

Primary Examiner—Steven D. Maki
(74) Attorney, Agent, or Firm—Frishauf, Holtz, Goodman & Chick, P.C.

(57) ABSTRACT

A cushion tire is formed from a rubber material without being provided with an airspace inside the tire. An aspect ratio, which is a ratio of a sectional height of a tire with respect to a width of the tire, is set to 15 to 80%. And a number of holes are formed in both bilateral side surfaces of the tire along a circumferential direction thereof.

2 Claims, 12 Drawing Sheets

CUSHION TIRE

BACKGROUND TECHNOLOGY

1. Technical Field of The Invention

The present invention relates to a tire for an industrial vehicle such as forklift truck, and more particularly, a cushion tire formed from a rubber material without forming any airspace inside the tire to thereby prevent a fear of blowouts.

2. Description of Prior Art

In an industrial vehicle such as forklift truck having a conventional structure, a large load is applied at a time of running at a low speed, and accordingly, in these days, a cushion tire formed from a rubber material, which has no inside airspace for preventing a fear of blowouts, has been widely utilized.

As such a cushion tire, a pneumatic type cushion tire and a press-on type cushion tire have been generally known. The pneumatic type cushion tire has a double-layer structure, as shown in a sectional view of a tire of FIG. 15, in which a tread rubber layer 1 is disposed at an outer circumferential side of the tire and a base rubber layer 2 is disposed at an inner circumferential side, and an aspect ratio, which is the ratio of the tire sectional height with respect to the tire width, is set to 95 to 120%. An outer appearance of the tire shown in FIG. 15 provides almost the same shape as that of a pneumatic tire so that the tire can be durable against a large load while making riding feeling comfortable at the vehicle running time.

Further, the press-on type cushion tire has a structure, as shown by a sectional view of FIG. 16, in which a tread rubber layer 1 is disposed at the outer circumferential side of the tire and a steel-made base band 12 is disposed at the inner circumferential side so that the tread rubber layer 1 is fixed to the base band 12, and an aspect ratio, which is the ratio of the tire sectional height to the tire width, is made to be lower than that of the abovementioned pneumatic type cushion tire.

The former pneumatic type cushion tire has a double structure provided with the tread rubber layer and the base rubber layer, and the aspect ratio, which is the ratio of the tire sectional height with respect to the tire width, is set to be high to 95 to 120%, so that a wheel, to which such pneumatic type cushion tire is fitted, becomes small in diameter, and accordingly, the inner circumferential space of the wheel hence becomes small. Therefore, only a small-sized brake can be housed in this inner circumferential space, resulting in a problem of reducing a braking performance of the industrial vehicle.

On the other hand, in the latter press-on type cushion tire, since the aspect ratio, which is the ratio of the tire sectional height to the tire width, is made lower than that of the former pneumatic type cushion tire, the inner circumferential space of a wheel to which the press-on type cushion tire is fitted can be made large, so that a large-sized brake can be installed in the inner circumferential space and the brake performance can be hence improved. However, the spring constant increases due to the low aspect ratio, the unevenness in the running road surface is directly transmitted to a vehicle's driver, and the riding feeling becomes extremely uncomfortable at the vehicle running time.

DISCLOSURE OF THE INVENTION

The present invention aims to provide a cushion tire capable of arranging a large-sized brake in an inner circumferential space of a wheel, providing a high cushioning performance and giving a very comfortable riding feeling at a vehicle running time.

A first invention provides a cushion tire formed from a rubber material without being provided with an airspace inside the tire, wherein an aspect ratio, which is a ratio of a sectional height of a tire with respect to a width thereof, is set to 15 to 80% and a number of holes are formed in both bilateral (right and left) side surfaces along a circumferential direction of the tire.

According to the first invention, the aspect ratio is made to be 15 to 80%, so that a diameter of a wheel to which the cushion tire is fitted can be set to be large, and in an industrial vehicle such as forklift truck or the like, an inner circumferential space of the wheel can be made enlarged, thus effectively arranging a large-sized brake and so on in this inner circumferential space. Moreover, since a number of holes are formed to the bilateral side surfaces, a spring constant is lowered by the formation of such holes, and hence, a cushioning performance can be enhanced and a riding feeling at the vehicle running time can be also made very comfortable.

A second invention provides a cushion tire constructed so that, in the first invention, a number of tread grooves are formed in the outer circumferential surface of the tire and the number of the holes is made identical to that of the tread grooves, each of the holes being disposed between the adjacent tread grooves.

According to the second invention, the number of the holes are made identical to that of the tread grooves and each of the holes is arranged between the adjacent tread grooves, so that the tread grooves and the holes can be uniformly arranged in the circumferential direction, a difference between the spring constants at one and another portions in the circumferential direction is made small, it is made possible to substantially prevent generation of vibration during the vehicle running due to the difference between the spring constants, and the riding feeling can be made comfortable.

A third invention provides a cushion tire constructed so that, in the second invention, a small-sized groove, having a size smaller than that of the tread groove, is formed between the adjacent tread grooves in the circumferential surface of the tire.

According to the third invention, since the small-sized groove is formed between the adjacent tread grooves in the circumferential surface, a severe wearing due to an unsymmetrical wearing phenomenon can be prevented even if such unsymmetrical wearing phenomenon be caused to the outer circumferential surface because of increasing of a travel distance due to a long term use of the tire, and by possibly reducing the wearing, the riding feeling can be prevented from becoming worse.

A fourth invention provides a cushion tire constructed so that, in any one of the first to third inventions, projections are formed so as to project sideways on the inner circumferential side of both the bilateral side surfaces of the tire so as to abut against rim flanges of the wheel.

According to the fourth invention, since the cushion tire is provided with a number of projections so as to project sideways on the inner circumferential side of both the bilateral side surfaces of the tire to thereby abut against rim flanges of the wheel, the projections forcibly abut against the rim flange in the horizontal direction, and accordingly, the fitting force of the tire to the rim when fitting the tire to the rim of the wheel can be increased.

A fifth invention provides a cushion tire constructed so that, in any one of the first to fourth inventions, a number of grooves, each extending in the tire width direction, are formed to the inner circumferential surface of the tire along the circumferential direction thereof.

According to the fifth invention, since a number of grooves are formed in the inner circumferential surface, even if the rim dimensions are uneven due to manufacturing errors of the wheel, the grooves formed in the inner circumferential surface act as escape portions for the compressed rubber material which can absorb the unevenness in the rim dimensions, whereby the fitting force of the tire to the rim can be increased when the tire is fitted to the rim of the wheel.

BRIEF DESCRIPTION OF THE DRAWINGS

FIGS. 7A and 7B include views showing variations of tread grooves formed to an outer circumferential surface of the tire, in which FIG. 7A shows the case of the first embodiment and FIG. 7B shows the case of the modified example thereof.

DETAILED DESCRIPTION OF THE INVENTION

The first embodiment of a cushion tire of the present invention will be described.

Figure 1:
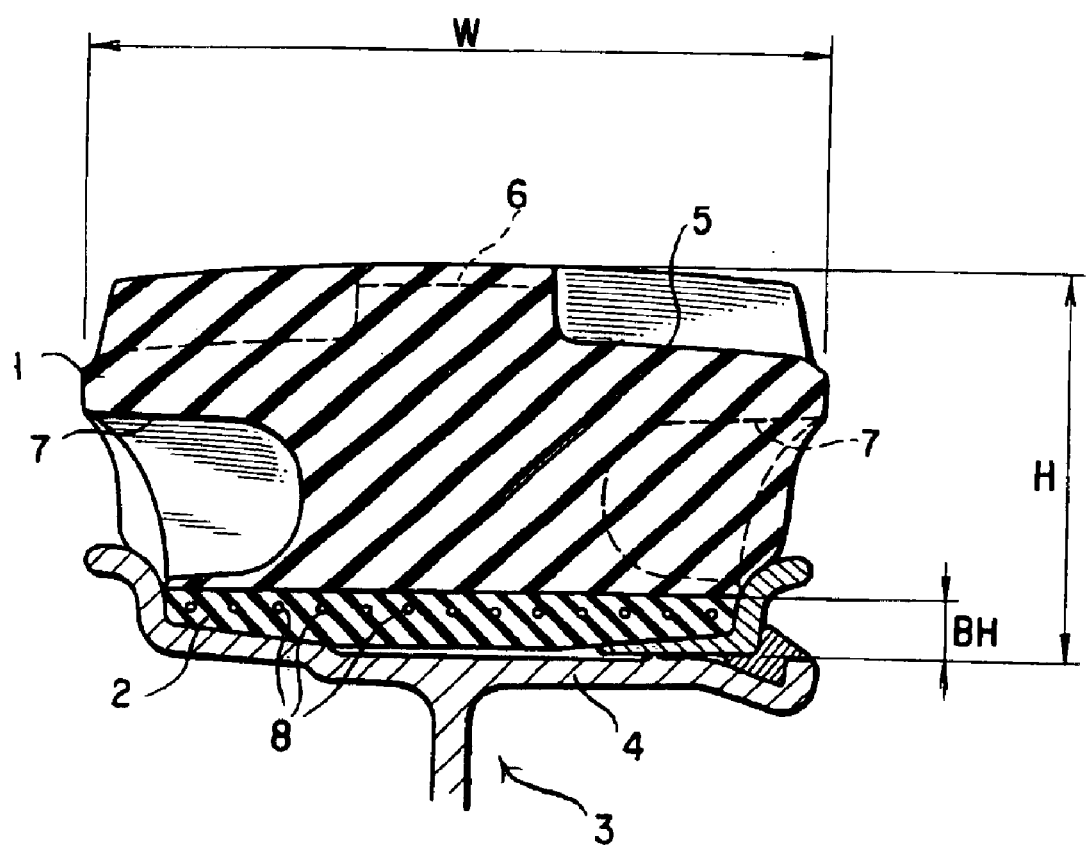
FIG. 1 is a sectional view of a first embodiment of a cushion tire according to the present invention.
Figure 2:
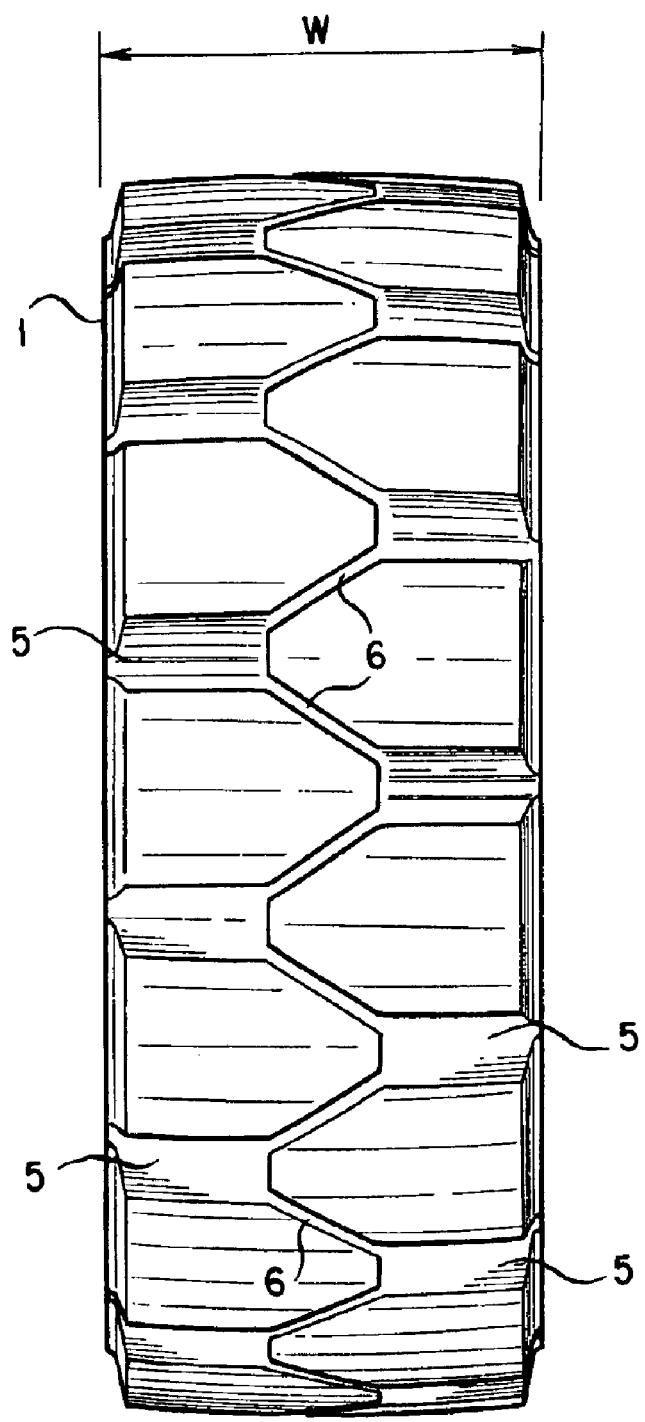
FIG. 2 is a front view showing an entirety of the first embodiment of the present invention.

The cushion tire is, as shown in the sectional view of FIG. 1, formed from a rubber material without forming any airspace inside the tire so as to provide a double-layer structure including a tread rubber layer 1 disposed at an outer circumferential side, which is grounded, and a base rubber layer 2 disposed at an inner circumferential side which is fitted to a rim 4 of a wheel 3. Further, as shown in the entire front view of FIG. 2, a number of tread grooves 5 are formed in the outer circumferential surface which is grounded, and the leftside and the rightside tread grooves 5 in the tire width direction are disposed so as to be shifted from each other, by a half pitch, in the circumferential direction of the tire, and furthermore, the tread grooves 5 are connected to each other through fine connecting grooves 6, respectively. An aspect ratio (H/W), which is the ratio of a tire sectional height (H) to a tire width (W), is set to 15 to 80%, and this aspect ratio (H/W) is as low as to be almost equivalent to that of the conventional press-on type cushion tire.

In the base rubber layer 2 disposed at the inner circumferential side, the ratio (BH/H) of the height of the base rubber layer 2 (BH) to the tire sectional height (H) is set to be as small as 10 to 30%, so that the aspect ratio (H/W), which is the ratio of the tire sectional height (H) to the tire width (W), can be set to 15 to 80%, while making the height (thickness) of the tread rubber layer 1 disposed at the outer circumferential side similar to that of the conventional example.

Figure 3:
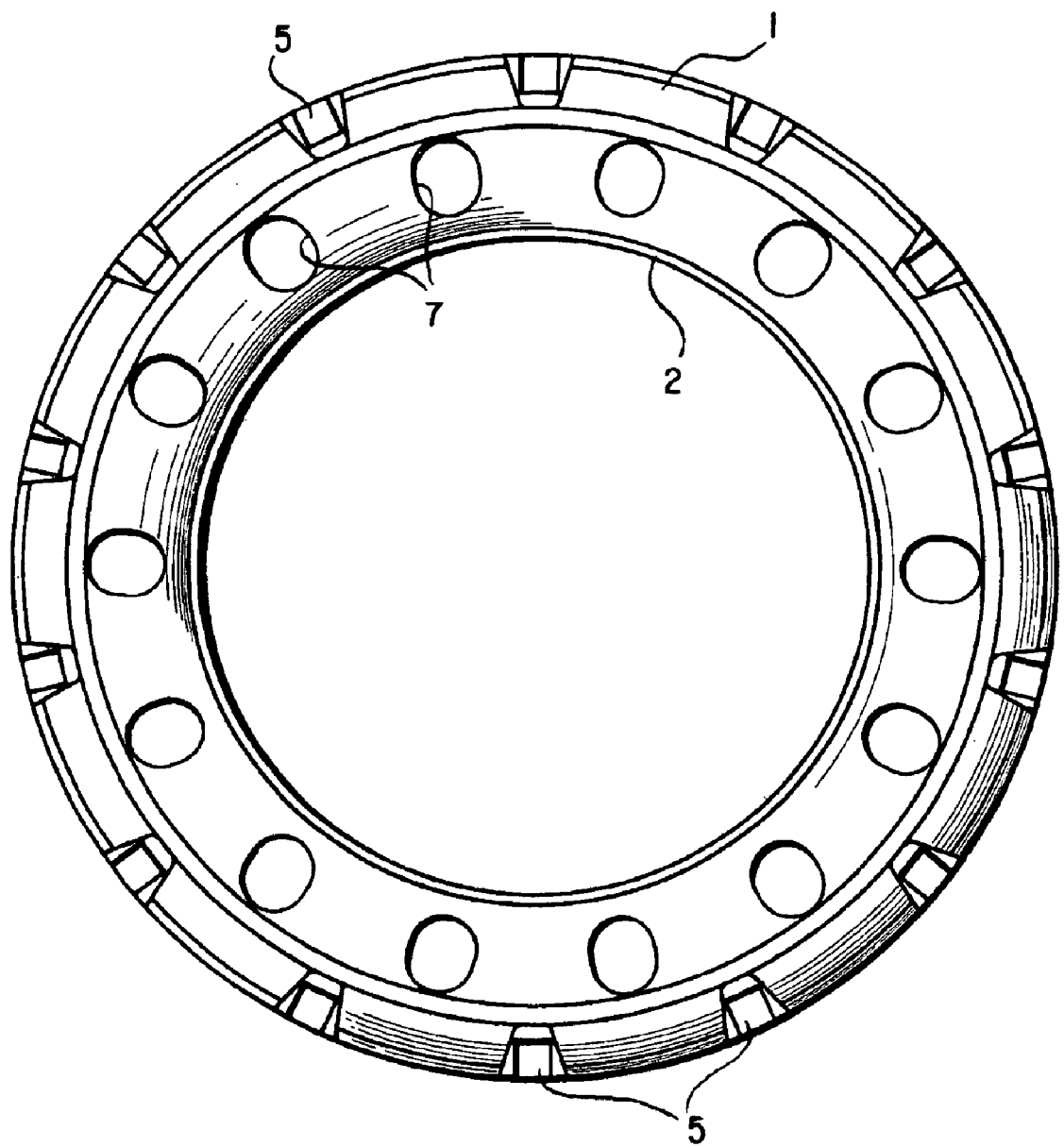
FIG. 3 is a side view showing the entirety of the first embodiment of the present invention.

Then, as shown in the side view of FIG. 3 showing the entire structure, a number of holes 7 are made in both the bilateral (right and left) side surfaces of the tread rubber layer 1 disposed at the outer circumferential side at predetermined intervals along, for example, the entire circumferential direction of the tire. The hole has an elliptic shape extending in the direction of the tire sectional height and depressed by approximately one fourth (¼) of the tire width in the direction of the tire width from both side surfaces, and the number of holes 7 is made to be the same as that of the tread grooves 5 to be formed in the outer circumferential surface. Concretely, if fourteen (14) tread grooves 5 are provided at one side of the tire, the holes 7 are also provided by the same number, fourteen at one side. Further, each of the holes 7 is disposed between the adjacent tread grooves 5, that is, at a portion at which no tread groove 5 is formed. The shape of the hole 7 is not limited to an ellipse, and may be circular. However, regarding the shape of the holes, the tire formed with the elliptic holes 7 can improve in the riding comfortableness and durability in comparison with the tire formed with the circular holes 7. Furthermore, the number of holes 7 is not limited to 14, but set to be the same as that of the tread grooves 5, and setting the number of tread grooves 5 in accordance with the diameter of the cushion tire, the number of holes 7 is also determined so as to be the same as that of the tread grooves. In general, the number of tread grooves 5 and the number of holes 7 are preferably in the range of 10 to 25, respectively, and if these numbers exceed 25, the tread grooves 5 become too small, being not practicable.

Furthermore, as shown in the sectional view of FIG. 1, a plurality of reinforcing core materials 8, which are oriented towards the circumferential direction of the tire, are embedded inside the base rubber layer 2 at even intervals in the tire width direction. The reinforcing core materials 8 is, for example, formed of wire members. A plurality of reinforcing core materials 8 are preferably densely disposed, and more specifically, the interval between the adjacent reinforcing core materials 8 is preferably 10 mm or less, and more preferably, 7 mm or less is optimum. It is preferable that the reinforcing core materials 8 adhere to the base rubber layer 2 by an adhesive and by means of plating applied to the reinforcing core materials 8. In addition, the reinforcing core materials 8 may be wire rods or steel-made plate members other than the wire members. Thus, by embedding the reinforcing core materials 8, even if the base rubber layer 2 is made thin, the rigidity of the tire can be maintained by the location of the reinforcing core materials 8, and the fitting force to the rim 4 when fitting the tire to the rim 4 of the wheel 3 can be increased. Furthermore, even if a tire load is applied to an interface of the reinforcing core materials 8, the occurrence of slippage herein is prevented by the adhesive or the like, and the reinforcing core materials 8 can be always closely contacted to the base rubber layer 2.

Further, the tread rubber layer 1 disposed at the outer circumferential side is formed so as to provide an increased hardness of rubber, and a rubber having a low hardness is not used. This is because, if the used rubber has a low hardness and is soft, the spring constant lowers, and the cushioning performance is hence increased, so that the riding feeling becomes comfortable, whereas, in a high load operation time, the rubber material deteriorates, internal heat generates, and heat storage phenomenon will occur. Therefore, it becomes necessary to suppress the internal heat generation due to the deterioration in the rubber material at the vehicle high load operation period by increasing the hardness of the rubber to be used, thus eliminating the heat storage phenomenon to thereby prevent a burst due to the heat storage phenomenon.

As mentioned above, by setting the aspect ratio (H/W), which is the ratio of the tire sectional height (H) to the tire width (W) to 15 to 80%, the diameter of the wheel 3 to which the tire is fitted can be increased, whereby the inner circumferential space of the wheel 3 can be increased in an industrial vehicle such as forklift truck, and a large brake or the like can be installed in this inner circumferential space. Furthermore, the possible arrangement of the large-sized brake can suppress the increase in the outer dimension of the tire. Moreover, the formation of a number of holes 7 in both the right and left side surfaces of the tread rubber layer 1 along the circumferential direction can improve the cushioning performance of the tire by lowering the spring constant through the formation of the holes 7 even if the aspect ratio (H/W), which is the ratio of the tire sectional height (H) to the tire width (W), is made low, and the unevenness of the running road surface can be prevented from being directly transmitted to a driver, whereby the riding feeling during the running can be made extremely comfortable. Furthermore, by forming the holes 7 in both the right and left side surfaces of the tread rubber layer 1, the heat dissipation performance at those portions can be increased, so that the heat generated inside the tire due to the deterioration of the rubber material at the high load applied time can be efficiently dispersed to the outside.

Furthermore, the number of holes 7 to be formed in both the bilateral side surfaces of the tread rubber layer 1 is set to be the same as that of the tread grooves 5 to be formed in the outer circumferential surface, and each of the holes 7 is disposed between the adjacent tread grooves 5, so that the tread grooves 5 and holes 7 can be uniformly arranged in the circumferential direction, the tread grooves 5 and holes 7 can be made free from overlapping each other, the difference between the spring constants at one and another positions in the circumferential direction can be made small, the occurrence of vibration due to the difference between the spring constants at one and another positions at the vehicle running time, and the riding feeling can be made extremely comfortable. Moreover, by disposing the hole 7 between the adjacent tread grooves 5, the holes 7 and tread grooves 5 are prevented from getting too close to each other, and any crack and damage can be prevented from occurring.

Figure 4:
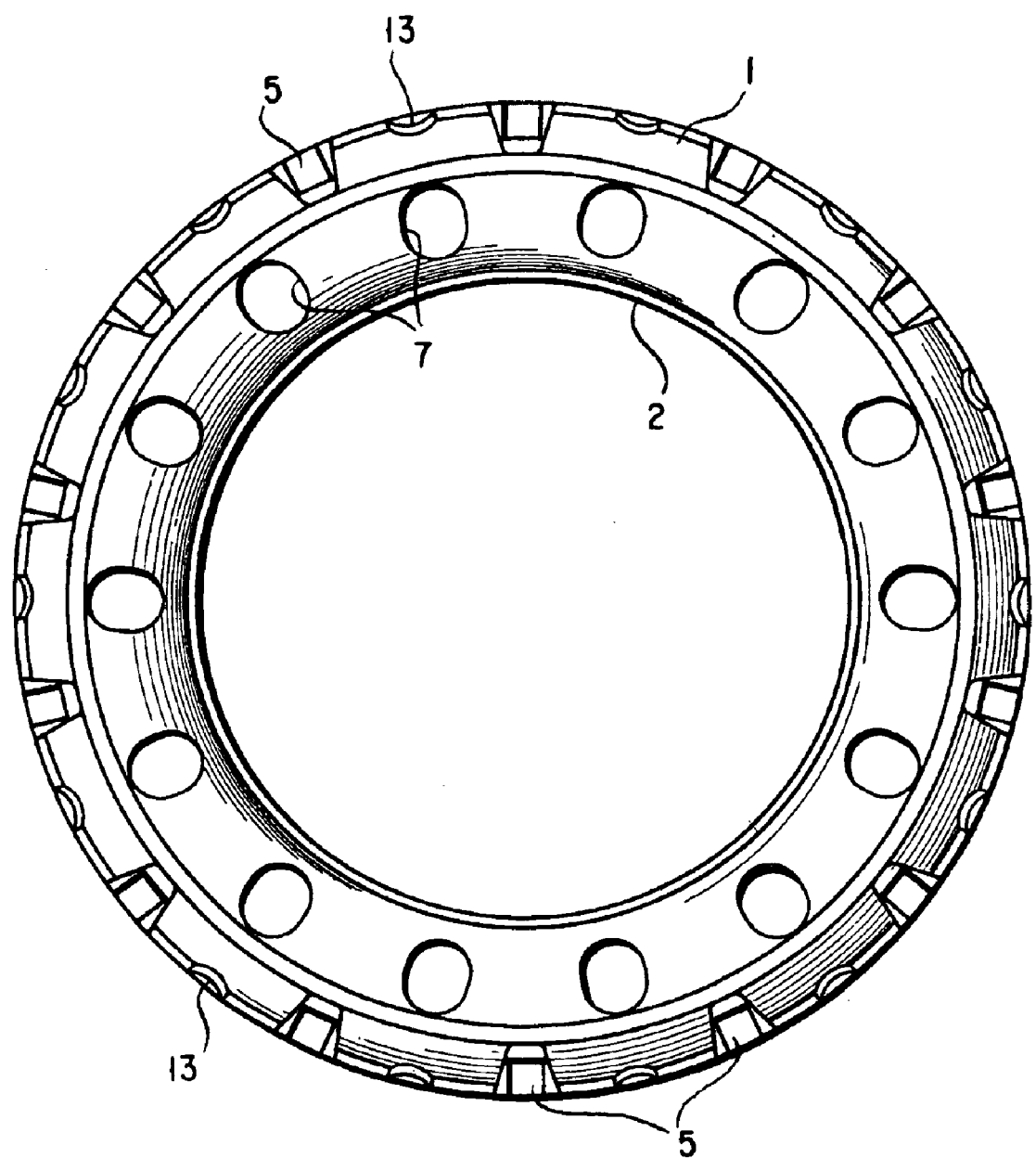
FIG. 4 is a side view showing an entirety of a modified example of the first embodiment of the present invention.
Figure 5:
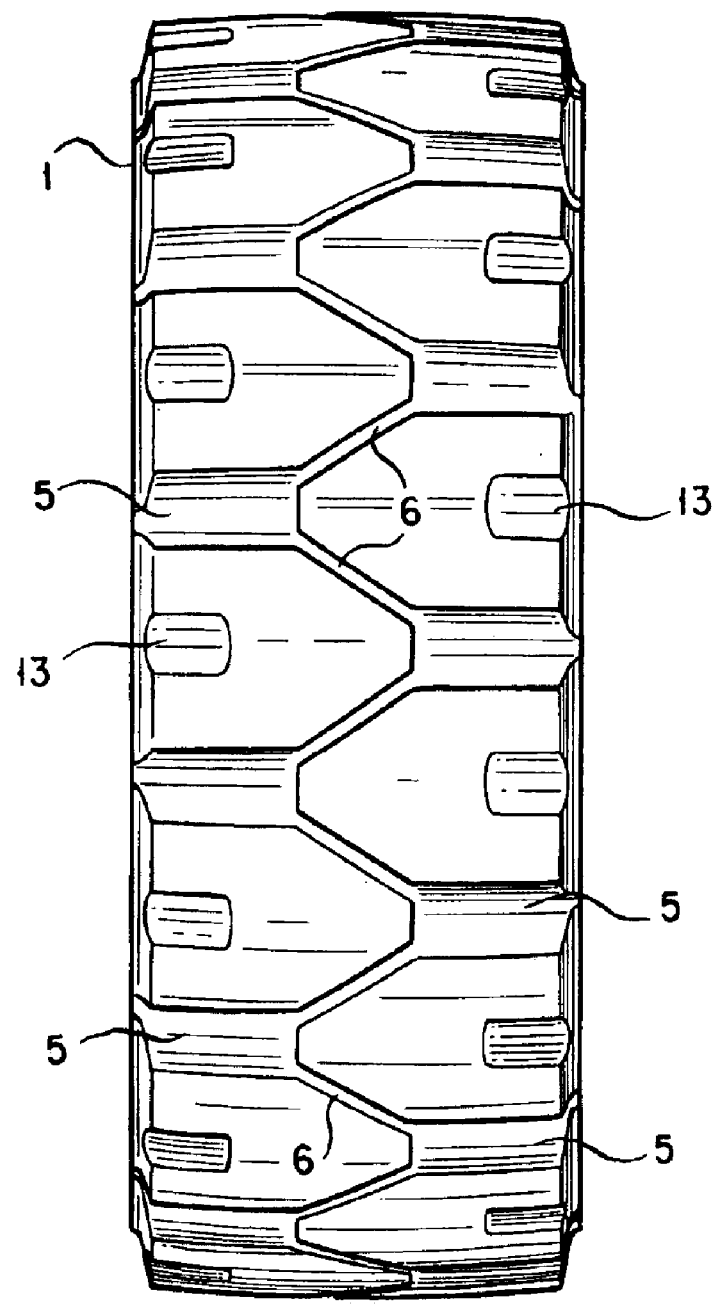
FIG. 5 is a front view showing the entirety of the modified example of the first embodiment of the present invention.
Figure 6:
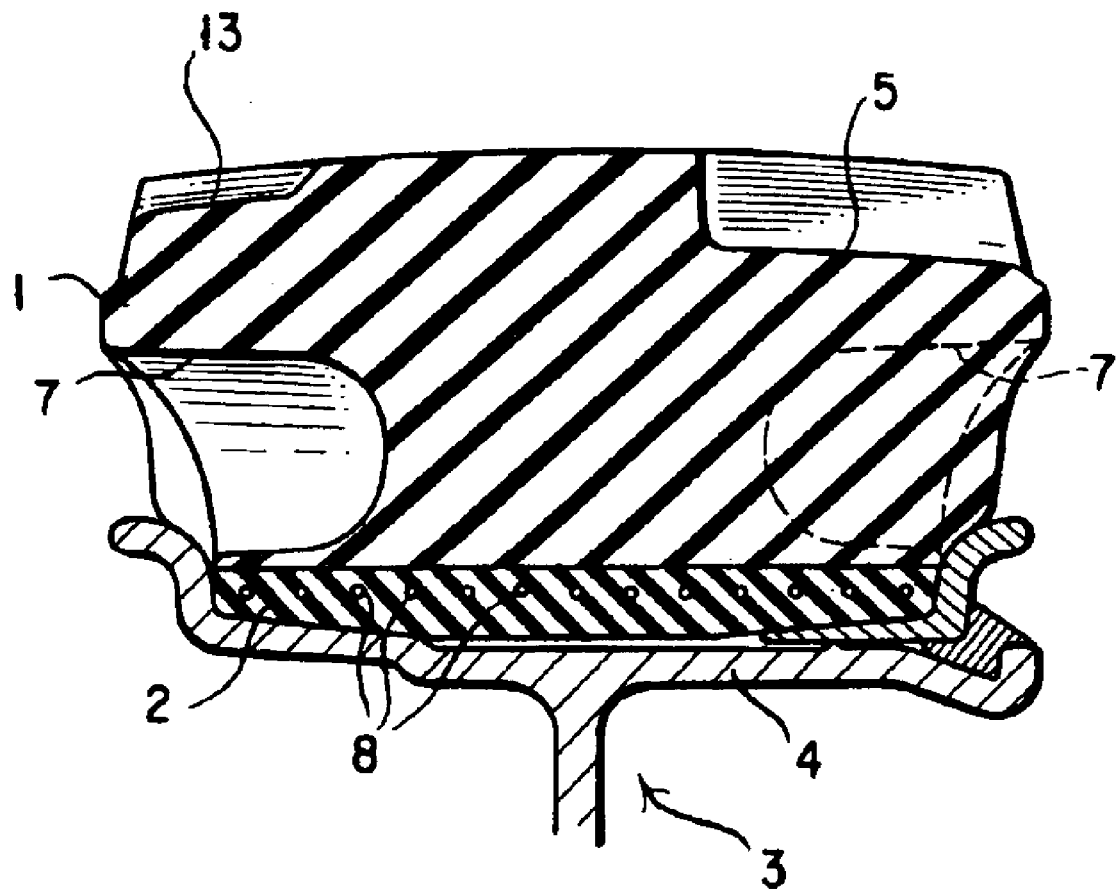
FIG. 6 is a sectional view of a tire of the modified example of the first embodiment of the present invention.

Further, hereunder, a modified example of the above first embodiment will be explained. This modified example has a basic structure which is the same as that of the first embodiment except for the following points. That is, with reference to the entire side view of FIG. 4, the entire front view of FIG. 5 and the sectional view of FIG. 6 which represent this modified example, a small groove 13 is formed to a portion between adjacent two tread grooves 5 formed on the tire outer circumferential surface, and more specifically, to a portion on the outer circumferential surface of the tire corresponding to the hole 7 formed to the side surface thereof. In other words, the small groove 13 is formed to a portion on the outer circumferential surface on a radial line passing the hole 7. This small groove 13 has a semi-circular cross sectional shape and a depth smaller than that of the tread groove 5, for example, less than half thereof, and furthermore, the small groove forming range to the tire circumferential surface is limited to both the end sides of the tire width direction. That is, the small groove 13 is not extended to the central portion between both ends of the tire width direction so as to be smaller than the tread groove 5.

Figure 7A:
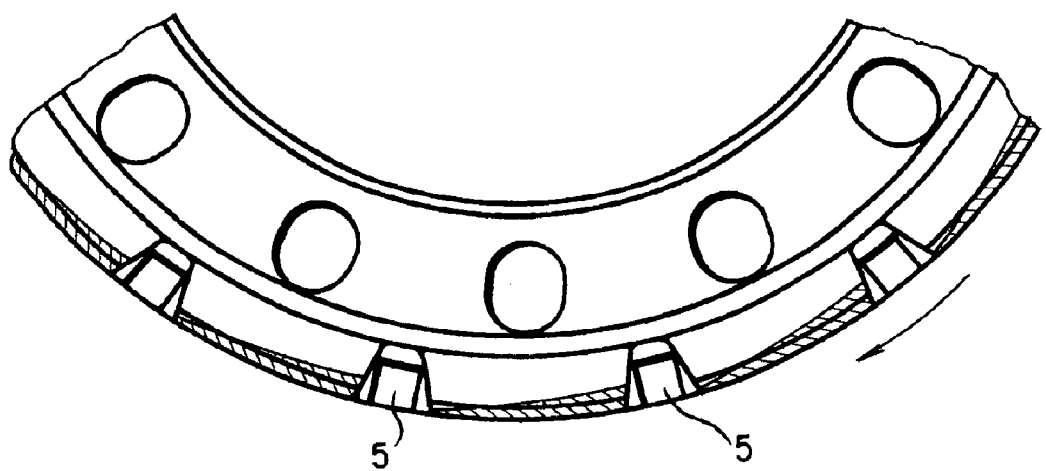
Figure 7B:
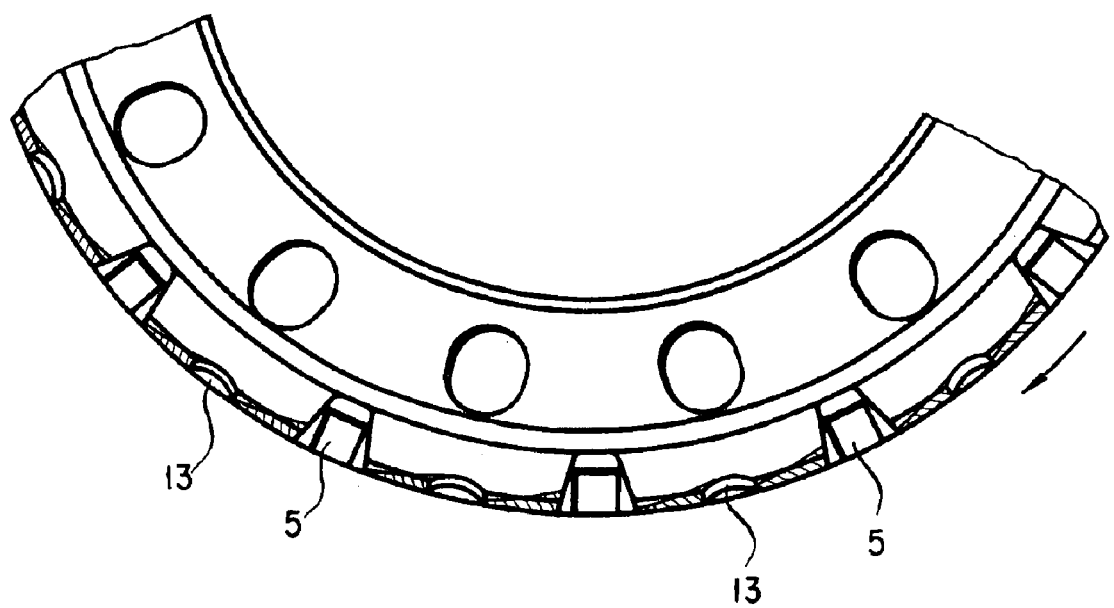

As mentioned above, by forming the small groove 13 between the respective adjacent tread grooves 5 to the outer circumferential surface of the tire, the following effects will be achieved. When a tire is used for a long time and travel (running) distance increases, there will occur unsymmetrical wearing phenomenon at which a corner portion or the rear edge portion in the travelling direction of the tread groove 5 wears on the tire outer circumferential surface. For this reason, in the known art, in the example, such as shown in FIG. 7A, in which only the tread grooves 5 are formed to the outer circumferential surface, large worn portions (shown with oblique lines in FIG. 7A throughout the portion between the respective adjacent tread grooves 5 will be generated by this unsymmetrical wearing phenomenon, and hence, the riding feeling is made worse. However, by forming the small groove 13 between the respective adjacent tread grooves 5 on the outer circumferential surface, as shown in FIG. 7B, the outer circumferential surface of the tire can be finely sectioned by such tread grooves and the small grooves 13, so that the worn portions generated by the aforementioned unsymmetrical wearing phenomenon can be made small within a range from the tread groove 5 to the small groove 13 (shown with oblique lines in FIG. 7B), and moreover, the riding feeling can be protected from being made worse even if the travel distance is increased for the long time use.

Furthermore, since the small groove 13 is made to be considerably small with respect to the tread groove 5, even if the small groove 13 and the hole 7 formed to the side surface of the tire are disposed at the corresponding portions, the distance between these hole 7 and the small groove 13 is not made narrow, and hence, an occurrence of any crack or damage to that portion can be prevented.

Further, the small groove 13 is not limited to the described one and its groove shape may be made to be V-shape, and its size may be made smaller, or slightly larger than that mentioned above.

Figure 8:
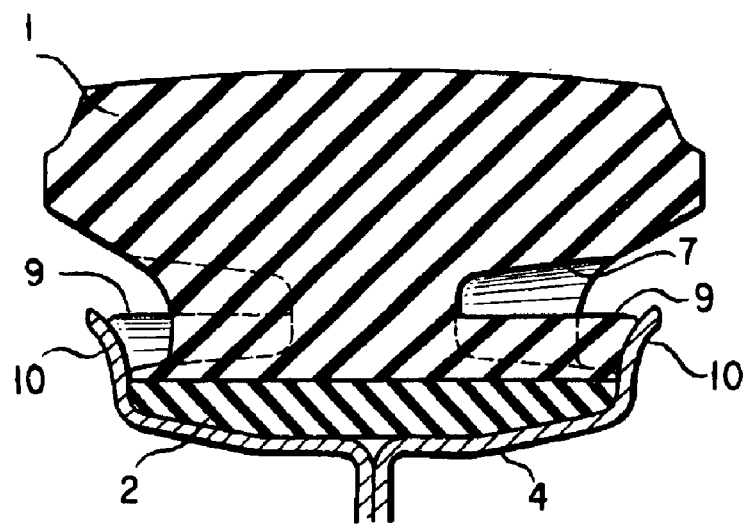
FIG. 8 is a sectional view of a second embodiment of a cushion tire of the present invention.
Figure 9:
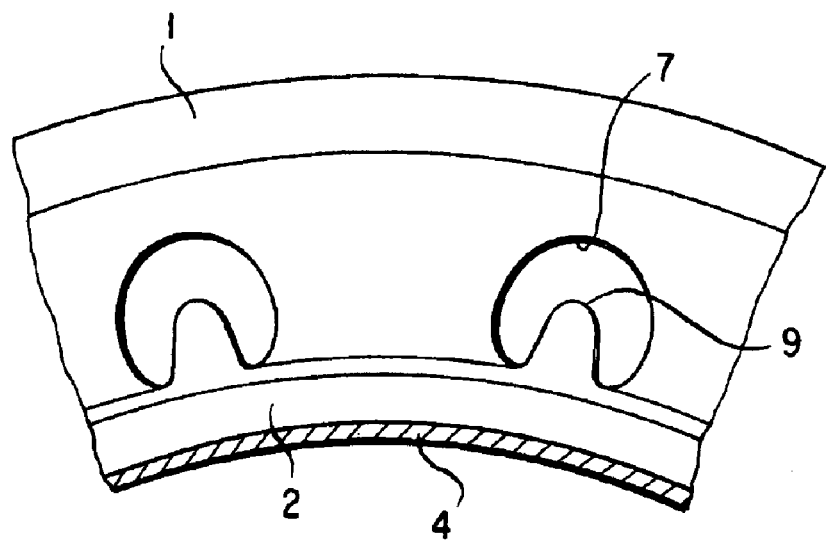
FIG. 9 is a partial schematic side view of the second embodiment of the present invention.

Next, the second embodiment will be described. Basically, the tire is constructed, in almost the same manner as in the first embodiment mentioned above, so as to provide a double structure including the tread rubber layer 1 at the outer circumferential side and the base rubber layer 2 at the inner circumferential side and formed from a rubber material so as not to form any airspace inside the tire, wherein the aspect ratio (H/W), which is the ratio of the tire sectional height (H) to the tire width (W), is set to 15 to 80%, and a number of holes 7 are formed in both the right and left side surfaces of the tread rubber layer 1 at predetermined intervals along the circumferential direction. In such structure, as shown in the tire sectional view of FIG. 8 and the partially schematic side view of FIG. 9, a number of projections 9 which project sideways from the inner circumferential sides of both the bilateral right and left side surfaces of the tread rubber layer 1 are provided at predetermined intervals along the circumferential direction. These projections 9 abut against rim flanges 10 of the wheel 3 and strongly abut against the rim 4 in the horizontal direction. The projections 9 are provided in the same number as that of the holes 7 formed in both the right and left side surfaces, which are formed within, for example, these holes 7, respectively. The height of the projection 9 is preferably set to be identical to that of the rim flange 10 of the wheel 3. It is desirable that the width of the projections 9 is wide. However, by setting the width to be one fourth to one half (¼ to ½) of the width of the hole 7, the projection 9 can be fitted with the rim 4 in a good condition, and the amount of use of the rubber material therefor can be reduced, thus economically saving the rubber material.

As mentioned above, a number of the projections 9 are formed at the inner circumferential sides of both the right and left side surfaces of the tread rubber layer 1 along the circumferential direction, and the projections 9 abut against the rim flanges 10 of the wheel 3, so that the projections 9 forcibly abut against the rim 4 in the horizontal direction and the fitting force to the rim 4, at the time when the tire is fitted to the rim 4 of the wheel 3, can be increased.

Figure 10:
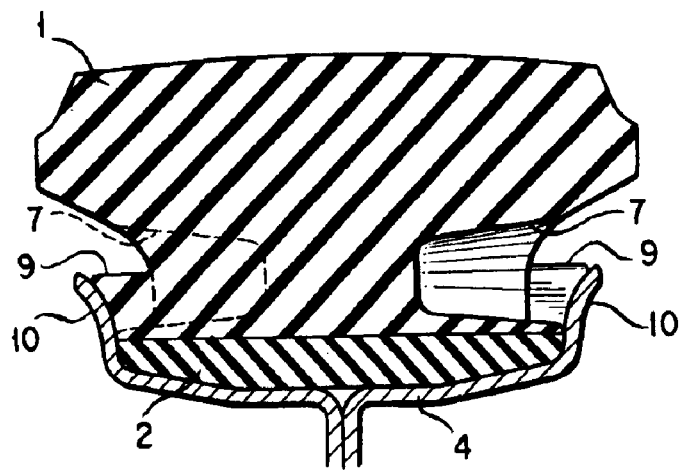
FIG. 10 is a sectional view of a first modified example of the second embodiment of the present invention.
Figure 11:
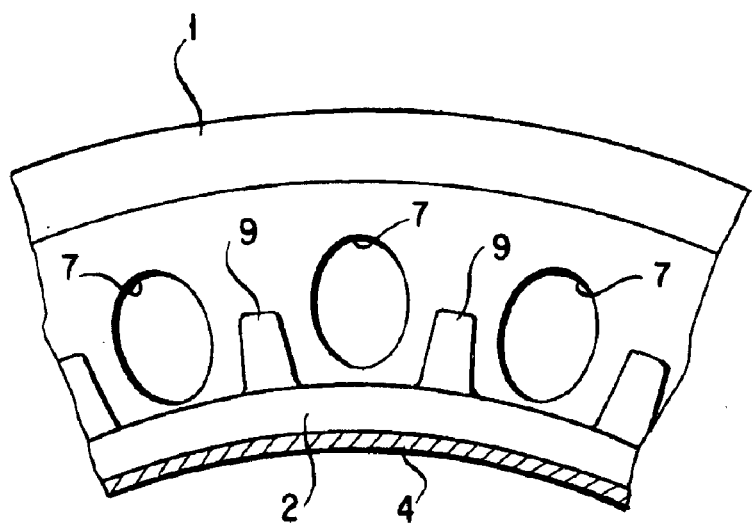
FIG. 11 is a partial schematic side view of the first modified example of the second embodiment of the present invention.
Figure 12:
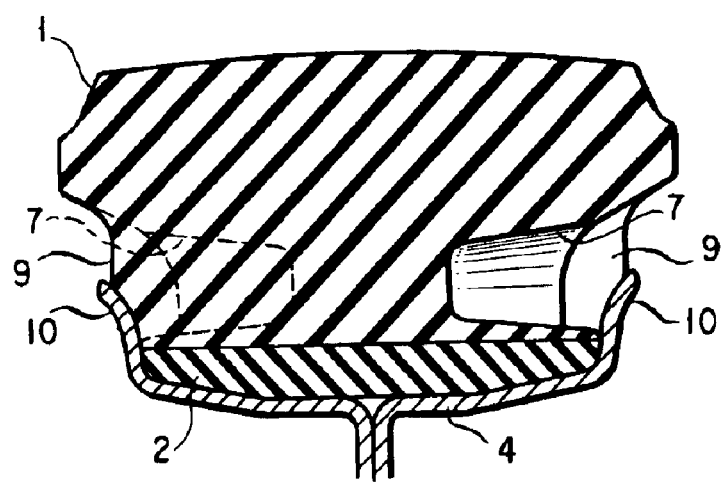
FIG. 12 is a sectional view of a second modified example of the second embodiment of the present invention.
Figure 13:
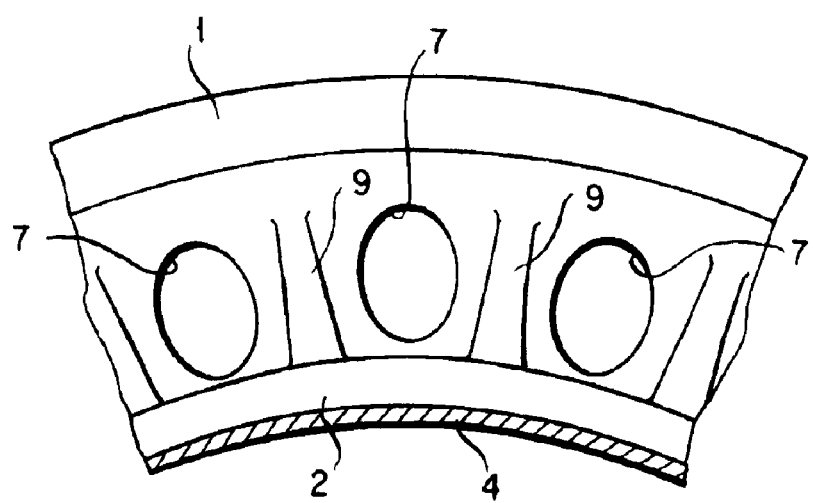
FIG. 13 is a partial schematic side view of the second modified example of the second embodiment of the present invention.

Furthermore, although, in the described embodiment, the projections 9 are formed within the holes 7 which are formed in both the right and left side surfaces of the tread rubber layer 1, the present invention is not limited to this embodiment, and the projections 9 may be formed, as shown in the tire sectional view of FIG. 10 and the partially schematic side view of FIG. 11, between the adjacent holes 7 which are formed in both the right and left side surfaces of the tread rubber layer 1. Furthermore, as a second modified example, as shown in the tire sectional view of FIG. 12 and the partially schematic side view of FIG. 13, the height of the projection 9 may be made higher than that of the rim flange 10 of the wheel 3.

Figure 14:
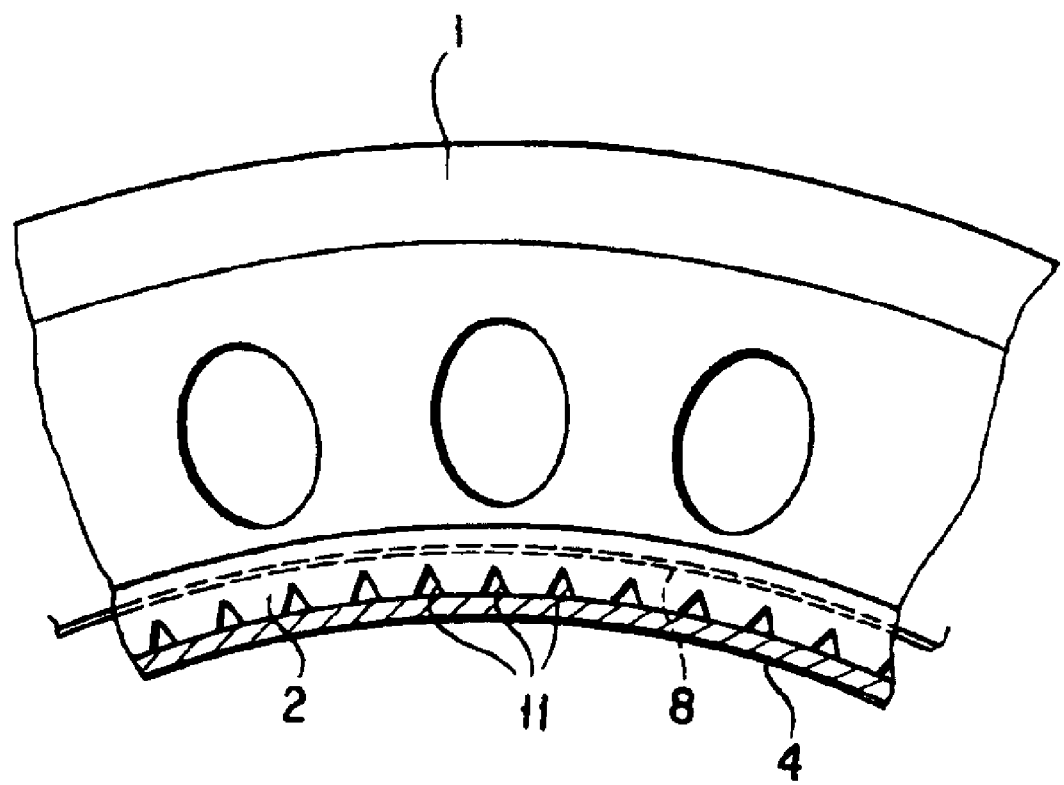
FIG. 14 is a partial schematic side view of a third embodiment of the present invention.
Figure 15:
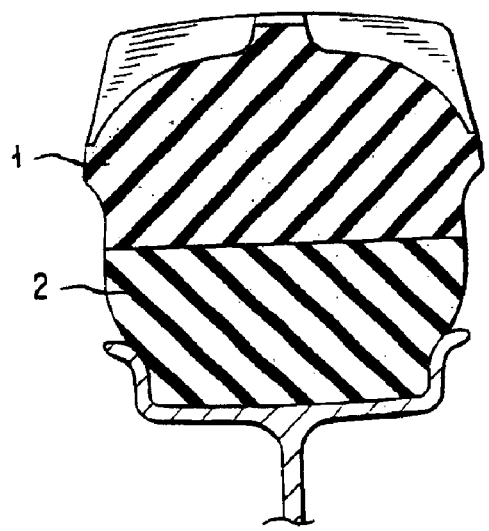
FIG. 15 is a sectional view of one example of a conventional tire.
Figure 16:
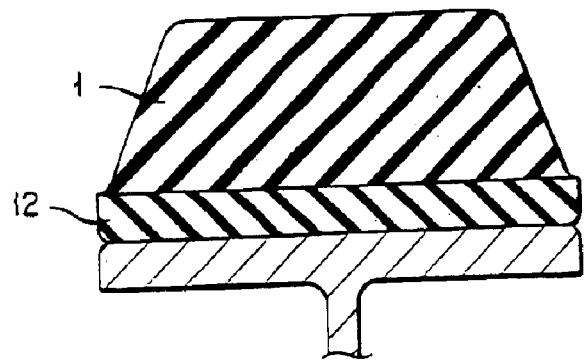
FIG. 16 is a sectional view of another example of a conventional tire.

Next, the third embodiment will be described. Basically, in substantially the same manner as that in the first or second embodiment mentioned above, the tire is constructed so as to provide a double structure including the tread rubber layer 1 at the outer circumferential side of the tire and the base rubber layer 2 at the inner circumferential side and formed from a rubber material so as not to provide any airspace inside the tire, so that the aspect ratio (H/W), which is the ratio of the tire sectional height (H) to the tire width (W), is set to 15 to 80%, and there are formed a number of holes 7 are formed in both the bilateral (right and left) side surfaces of the tread rubber layer 1 at predetermined intervals along the circumferential direction. In such a structure, as shown in the partially schematic side view of FIG. 14, a number of grooves 11 extending in the tire width direction at the inner circumferential surface along the circumferential direction of the base rubber layer 2 abutting against and being fitted with the rim 4 of the wheel 3. The volume of the entirety of the grooves 11 formed along the circumferential direction may be set to be approximately 0.5 to 2 times of the reduction in volume of the rubber material due to the compression of the rubber material between the rim 4 and a reinforcing core material 8 in the base rubber layer 2 when the base rubber layer 2 is fitted with the rim 4.

As mentioned above, by forming a number of grooves 11 extending in the tire width direction of the inner circumferential surface of the base rubber layer 2 along the circumferential direction thereof, when the tire is fitted to the rim 4 of the wheel 3, even if the dimensions of the rim 4 are made uneven due to a manufacturing error of the wheel 3, the base rubber layer 2 escapes inside the grooves 11 formed in the inner circumferential surface of the tire, and a large force which may be applied to the reinforcing core material 8 embedded in the base rubber layer 2 can be ignored. Thus, the reinforcing core material 8 is prevented from breaking, and the fitting force to the rim 4 at a time of fitting the tire to the rim 4 of the wheel 3 can also be increased.

Furthermore, in the described respective embodiments, there is explained a cushion tire, particularly of a pneumatic type, which provides a double-structure including the tread rubber layer 1 disposed at the outer circumferential side and the base rubber layer 2 disposed at the inner circumferential side. However, the present invention is not limited to this type, and for example, the present invention may be a cushion tire having a structure that a cushioning layer is inserted inside as an intermediate layer, or a press-on type cushion tire structured so as to have the tread rubber layer 1 disposed at the outer circumferential side and a steel-made base band disposed at the inner circumferential side.

Still furthermore, although, in the respective embodiments mentioned above, the number of holes 7 formed in both the bilateral (right and left) side surfaces is set to be the same as that of the tread grooves 5, the present invention is not limited to this example, and for instance, the holes 7 may be arranged in two rows spaced from each other in the direction of the tire sectional height, and the number of holes 7 may be set twice the number of tread grooves 5 in this case.

Further, it is to be noted that, although the present invention is disclosed as an invention which is applicable to the tire of an industrial vehicle such as forklift truck, the present invention is not limited to such specific embodiment or application, and many other applications will be suggested for those skilled in the art. Furthermore, it will be caused for experts in this art field to make various amendments, modifications and changes in the details of the illustrated and described embodiments so as to be conformed with design or like or with the necessity of the applications. Accordingly, it is reasonable that the present invention is understood by a method coincident with correct meaning or proper aspect of broader scopes of the appended claims.

What is claimed is:

1. A cushion tire formed from a rubber material without being provided with an airspace inside the tire, the tire comprising:

a number of width direction tread grooves formed in the outer circumferential surface of the tire; and a number of holes formed in both side wall surfaces of the tire along a circumferential direction of the tire;

wherein a ratio of a sectional height of the tire with respect to a width of the tire is set to 15 to 80%, and a ratio of a height of a base rubber layer to the sectional height of the tire is set to 10 to 30%;

wherein the number of the holes is identical to the number of the tread grooves, each of the holes is disposed between adjacent tread grooves, and a depth of each of said holes is approximately one-fourth of the width of the tire in a width direction of the tire;

wherein a small-sized groove is formed at a position between each of the adjacent tread grooves in the circumferential surface of the tire and corresponding to each of said holes, and each of the small sized grooves is formed parallel to the tread grooves and has a size smaller than a size of the tread grooves and a depth shallower than a depth of the tread grooves;

wherein a plurality of reinforcing core materials, which are oriented towards the circumferential direction of the tire, are embedded inside the base rubber layer of the tire at even intervals of 10 mm or less in a width direction of the tire;

wherein said reinforcing core materials adhere to the base rubber layer by adhesive and by means of plating applied to the reinforcing core materials; and wherein a number of projections are formed to project sideways on an inner circumferential side of both of the side surfaces of the tire for abutting against rim flanges of a wheel.

2. The cushion tire according to claim 1, further comprising a number of additional grooves, each extending in the width direction of the tire, formed on an inner circumferential surface of the tire along the circumferential direction of the tire and disposed such that said additional grooves absorb unevenness in rim dimensions of a wheel.

* * * * *